US008068951B2

(12) United States Patent
Chen et al.

(10) Patent No.: US 8,068,951 B2
(45) Date of Patent: *Nov. 29, 2011

(54) VEHICLE DIAGNOSTIC SYSTEM

(76) Inventors: Ieon C. Chen, Laguna Hills, CA (US); Keith Andreasen, Garden Grove, CA (US); Phuong Pham, Huntington Beach, CA (US); Robert Madison, Corona, CA (US)

( * ) Notice: Subject to any disclaimer, the term of this patent is extended or adjusted under 35 U.S.C. 154(b) by 713 days.

This patent is subject to a terminal disclaimer.

(21) Appl. No.: 12/077,855

(22) Filed: Mar. 21, 2008

(65) Prior Publication Data

US 2008/0177438 A1 Jul. 24, 2008

Related U.S. Application Data

(63) Continuation-in-part of application No. 11/166,719, filed on Jun. 24, 2005, now abandoned, and a continuation-in-part of application No. 11/823,757, filed on Jun. 28, 2007, and a continuation-in-part of application No. 11/172,293, filed on Jun. 30, 2005.

(51) Int. Cl.
*G06F 19/00* (2006.01)

(52) U.S. Cl. .................. 701/33; 701/1; 701/29; 701/32; 340/438; 340/439

(58) Field of Classification Search ........................ None
See application file for complete search history.

(56) References Cited

U.S. PATENT DOCUMENTS

| | | | |
|---|---|---|---|
| 2,960,654 | A | 11/1960 | Nelson |
| 3,646,438 | A | 2/1972 | Staff |
| 4,112,748 | A | 9/1978 | Walley |
| 4,176,315 | A | 11/1979 | Sunnarborg |
| 4,207,611 | A | 6/1980 | Gordon |
| 4,404,639 | A | 9/1983 | McGuire et al. |
| 4,684,896 | A | 8/1987 | Weishaupt |
| 4,689,573 | A | 8/1987 | Hilmer |
| 4,859,932 | A | 8/1989 | Whitley |
| 4,884,033 | A | 11/1989 | McConchie, Sr. |
| 5,003,478 | A | 3/1991 | Kobayashi et al. |
| 5,005,129 | A | 4/1991 | Abe et al. |
| 5,032,791 | A | 7/1991 | Bates, Jr. |
| 5,107,428 | A | 4/1992 | Bethencourt et al. |
| 5,157,708 | A | 10/1992 | Garthwaite et al. |
| 5,170,125 | A | 12/1992 | Bates, Jr. |
| 5,214,582 | A | 5/1993 | Gray |
| 5,247,245 | A | 9/1993 | Nelson |
| 5,278,508 | A | 1/1994 | Bowman |
| 5,285,163 | A | 2/1994 | Liotta |

(Continued)

*Primary Examiner* — Dalena Tran
*Assistant Examiner* — Jonathan Sample
(74) *Attorney, Agent, or Firm* — Stetina Brunda Garred & Brucker

(57) ABSTRACT

There is provided a method of providing vehicle support. The method includes receiving diagnostic data from the onboard vehicle computer. The diagnostic data is received by an automotive diagnostic tool and is then communicated to a prior experience database having information related to diagnostic solutions associated with combinations of diagnostic data. The prior experience database is arranged to match the received diagnostic data to possible diagnostic solutions. The diagnostic solutions are then prioritized in accordance with ranked matches of the received diagnostic data to the previous combinations of diagnostic data stored in the prior experience database. The possible diagnostic solution associated with the highest ranked combination of diagnostic data is identified as the most likely solution. Vehicle components associated with the most likely solution are then identified. The diagnostic tool is subsequently configured to log diagnostic data related to the vehicle components associated with the most likely solution.

11 Claims, 4 Drawing Sheets

U.S. PATENT DOCUMENTS 5,359,290 A 10/1994 Cervas
5,394,093 A 2/1995 Cervas
5,400,018 A 3/1995 Scholl et al.
5,481,906 A 1/1996 Nagayoshi et al.
5,491,418 A 2/1996 Alfaro et al.
5,506,772 A 4/1996 Kubozono et al.
5,541,840 A 7/1996 Gurne et al.
5,631,831 A * 5/1997 Bird et al. ........................ 701/29
5,635,841 A 6/1997 Taylor
5,657,233 A 8/1997 Cherrington et al.
5,758,300 A 5/1998 Abe
5,916,286 A 6/1999 Seashore et al.
5,935,180 A 8/1999 Fieramosca et al.
6,141,608 A * 10/2000 Rother ............................ 701/33
6,225,898 B1 5/2001 Kamiya et al.
6,263,265 B1 7/2001 Fera
6,263,268 B1 * 7/2001 Nathanson ...................... 701/29
6,263,322 B1 * 7/2001 Kirkevold et al. ............ 705/400
6,295,492 B1 9/2001 Lang et al.
6,330,499 B1 12/2001 Chou et al.
6,389,337 B1 * 5/2002 Kolls .............................. 701/29
6,473,659 B1 * 10/2002 Shah et al. ...................... 700/79
6,535,802 B1 3/2003 Kramer
6,636,790 B1 * 10/2003 Lightner et al. ................ 701/33
6,680,675 B1 1/2004 Suzuki
6,687,584 B2 2/2004 Andreasen et al.
6,732,031 B1 * 5/2004 Lowrey et al. .................. 701/33
6,957,133 B1 * 10/2005 Hunt et al. ...................... 701/29
7,209,860 B2 * 4/2007 Trsar et al. .................... 702/183
7,590,476 B2 * 9/2009 Shumate ......................... 701/29
7,684,908 B1 * 3/2010 Ogilvie et al. .................. 701/32
2001/0053983 A1 12/2001 Reichwein et al.
2002/0007237 A1 * 1/2002 Phung et al. .................... 701/33
2002/0156692 A1 10/2002 Squeglia et al.
2002/0193925 A1 12/2002 Funkhouser et al.
2003/0060953 A1 * 3/2003 Chen ............................... 701/33
2003/0171111 A1 * 9/2003 Clark ......................... 455/414.1
2003/0177417 A1 * 9/2003 Malhotra et al. ................ 714/42
2004/0044454 A1 * 3/2004 Ross et al. ...................... 701/33
2004/0172177 A1 * 9/2004 Nagai et al. ..................... 701/29
2005/0021294 A1 * 1/2005 Trsar et al. .................... 702/183
2005/0060070 A1 * 3/2005 Kapolka et al. ................. 701/29
2005/0143882 A1 * 6/2005 Umezawa ....................... 701/29
2006/0095230 A1 * 5/2006 Grier et al. .................... 702/183
2006/0161313 A1 * 7/2006 Rogers et al. ..................... 701/1
2009/0006476 A1 * 1/2009 Andreasen et al. ........ 707/104.1

* cited by examiner

VEHICLE DIAGNOSTIC SYSTEM

CROSS-REFERENCE TO RELATED APPLICATIONS

The present application is a continuation-in-part of U.S. application Ser. No. 11/166,719 entitled AUTOMOTIVE DATA LOGGER filed Jun. 24, 2005, now abandoned U.S. application Ser. No. 11/172,293 entitled CELLPHONE BASED VEHICLE DIAGNOSTIC SYSTEM filed Jun. 30, 2005, and U.S. application Ser. No. 11/823,757 entitled AUTOMOTIVE DIAGNOSTIC AND REMEDIAL PROCESS filed Jun. 28, 2007, the disclosures of which are incorporated herein by reference.

STATEMENT RE: FEDERALLY SPONSORED RESEARCH/DEVELOPMENT (Not Applicable)

BACKGROUND OF THE INVENTION

1. Field of the Invention

The present invention relates generally to vehicle support systems and more specifically to a method of providing a vehicular diagnostic evaluation based on an analysis of vehicle operation data.

2. Description of the Related Art

Many of today's vehicles include a wide range of systems and components that perform various operations while the vehicle is in use. Over time, repeated use of the vehicle may cause failure of individual systems or components. As such, most vehicles are equipped with an onboard diagnostic computer in communication with the various systems and components included on the vehicle. The onboard computer may monitor the operation of the systems and components by logging diagnostic data generated during use of the vehicle. Although the onboard diagnostic computers may log data generated in response to operation of the vehicle, the diagnostic computer may not be capable of analyzing the data to identify the ultimate failure source plaguing the particular vehicle.

As such several diagnostic and support tools have been developed with the aim of providing the owner of the vehicle with vehicular diagnostic information. For instance, several handheld diagnostic tools have been designed to offer the owner of the vehicle a means of accessing and retrieving the diagnostic data logged by the onboard diagnostic computer. Once the diagnostic data is retrieved, it may be analyzed to determine a failure source.

In some instances, the diagnostic data logged by the onboard diagnostic computer includes a failure code generated by the vehicle's systems and components when a particular system or component is failing or is about to fail. The failure code may be associated with a particular system or component that is failing. Therefore, by retrieving the failure code, the particular system or component may be identified and treated.

However, given the complex nature of today's vehicles, several failure codes may be generated at any given time. In other words, the failure of one particular system or component may cause other systems or components to operate incorrectly. As such, the source of all the failure codes may trace back to one failure source. The invention disclosed in patent application Ser. No. 11/823,757, entitled Automotive Diagnostic and Remedial Process, is directed to a diagnostic system for determining a likely failure source for a particular combination of failure codes. The likely failure source is determined by matching the particular combination of failure codes generated by the test vehicle with combinations of failure codes in a prior experience database. The prior experience database includes various combinations of failure codes associated with likely failure sources. The failure source associated with the combination of failure codes in the prior experience database having the highest number of failure codes in common with the particular combination of failure codes obtained from the onboard diagnostic computer may be considered the likely failure source.

The identified likely failure source provides the owner of the vehicle with valuable diagnostic information. However, additional information may be required before the vehicle can be completely repaired. For instance, confirmation that the likely failure source is the actual failure source may be required. Furthermore, information regarding the extent of the failure may also be needed in order to provide the most cost effective repair.

As is apparent from the foregoing, there exists a need in the art for a method of retrieving and analyzing vehicular diagnostic information in order to more readily identify a failure source. The present invention addresses this particular need, as will be discussed in more detail below.

BRIEF SUMMARY OF THE INVENTION

According to an aspect of the present invention, there is provided a method of providing vehicle support through analysis of data received from an onboard vehicle computer. The method includes the steps of receiving vehicle diagnostic data from the onboard vehicle computer. The vehicle diagnostic data is received by an automotive diagnostic tool. The vehicle diagnostic data is then communicated from the automotive diagnostic tool to a prior experience database. The prior experience database includes information related to diagnostic solutions associated with combinations of diagnostic data. The prior experience database is arranged to match the received vehicle diagnostic data to possible diagnostic solutions. The possible diagnostic solutions are then prioritized in accordance with ranked matches of the received diagnostic data to the previous combinations of diagnostic data stored in the prior experience database. The possible diagnostic solution associated with the highest ranked combination of diagnostic data is identified as the most likely solution. Vehicle components associated with the most likely solution are then identified. The automotive diagnostic tool is subsequently configured to log diagnostic data related to the vehicle components associated with the most likely solution.

It is contemplated that the present invention may provide more accurate and reliable diagnostic information than is available by known systems and methods. The logged diagnostic data related to the vehicle components associated with the most likely solution may be compared with the prioritized result obtained from the prior experience database to confirm that the most likely failure source is the actual failure source. Furthermore, it is also understood that data that is obtained during the above-described method may be communicated to several remote locations in order to provide the operator of the vehicle with a diagnostic support network. For instance, the most likely failure source may be communicated to the driver's cell phone to alert the driver of the problem with the vehicle. In addition, the most likely failure source may be communicated to a customer support center. In this manner, the customer support center may begin diagnostic support tailored to the specific needs of that vehicle without requiring the operator to call into the customer support center in order to receive diagnostic assistance. It may be desirable to wirelessly communicate data from the automotive diagnostic tool in order to more easily disseminate the diagnostic data.

In addition to the foregoing, another aspect of the present invention includes a method of providing vehicle support based on data received from an onboard vehicle computer. The method includes the step of programming a handheld automotive diagnostic tool to log vehicle operation data in response to detection of a specified vehicle diagnostic code. The tool is then connected to the onboard vehicle computer to receive diagnostic data therefrom. The diagnostic data includes vehicle diagnostic codes and the vehicle operation data. The diagnostic data is buffered for a selectable period of time. The diagnostic data is also analyzed to detect the occurrence of the specified vehicle diagnostic code. Vehicle operation data is then logged in the automotive diagnostic tool in response to detection of the specified vehicle diagnostic codes. The automotive diagnostic tool is then interfaced with a wireless communication link to communicate the diagnostic data and the logged vehicle operation data to a remote location.

The logged diagnostic data may be useful for many different purposes. For instance, the logged data may be helpful in order to provide a more thorough and accurate diagnosis for a particular vehicle. In addition, the logged data may be stored in a database for subsequent retrieval of vehicle operation data. It may be desirable to retrieve such data for accident reconstruction purposes to determine the events leading up to and during an accident.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings in which like numbers refer to like parts throughout and in which.

DETAILED DESCRIPTION OF THE INVENTION

Figure 1:
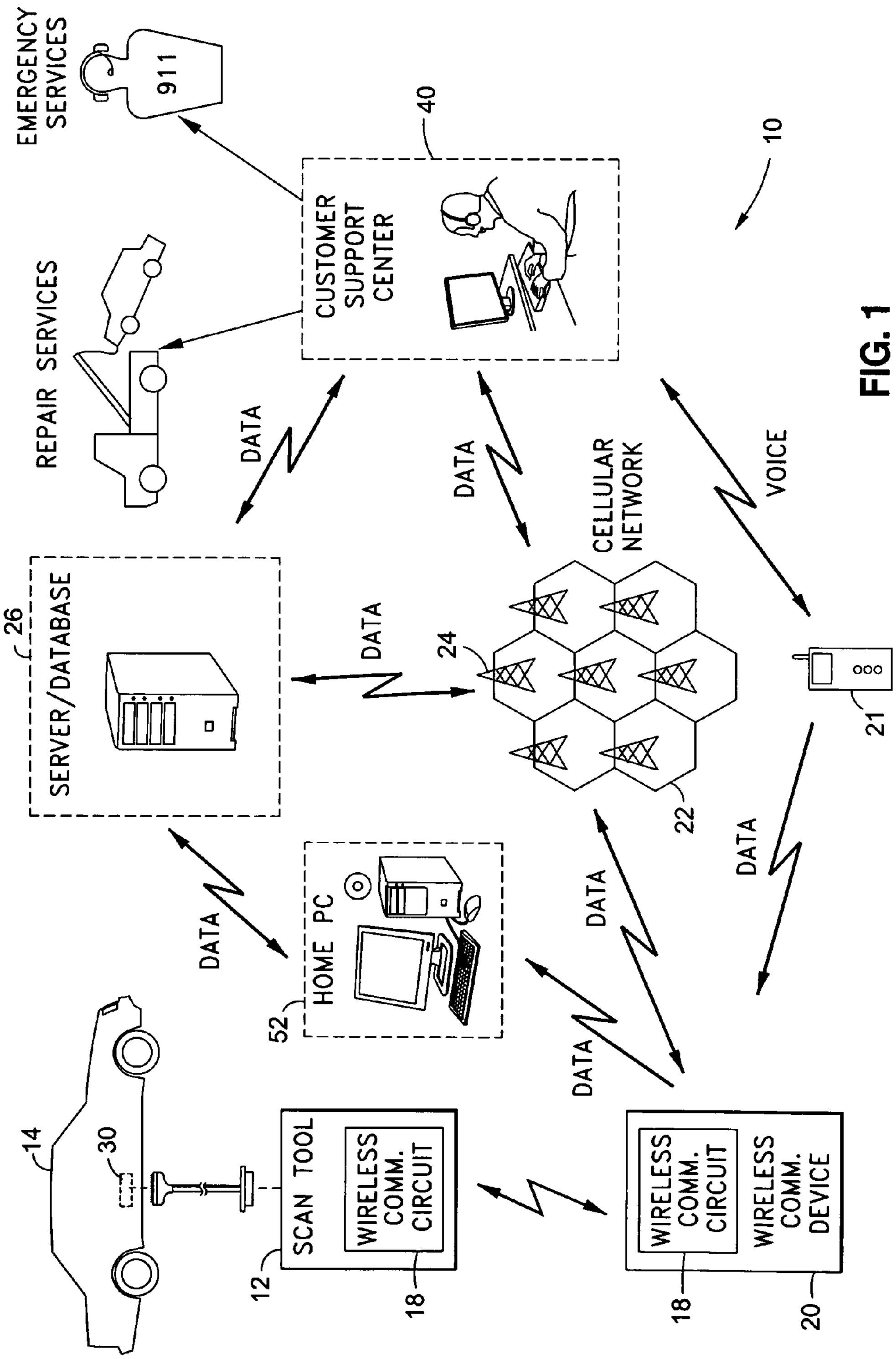
FIG. 1 is a schematic diagram of an embodiment of a vehicle support network, in accordance with an aspect of the present invention.
Figure 2:
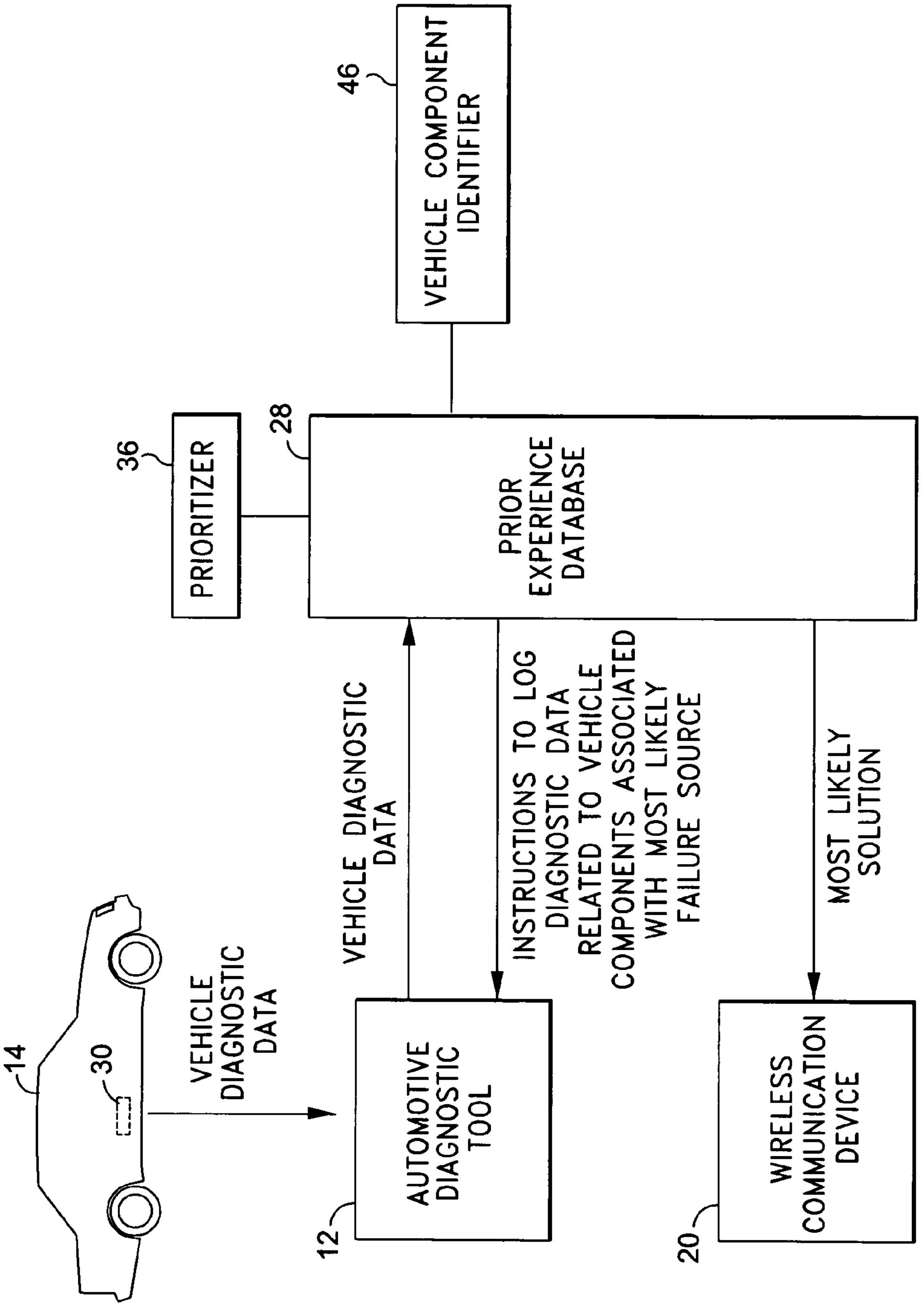
FIG. 2 illustrates one embodiment of a vehicle support and diagnostic process, in accordance with an aspect of the present invention.

Referring now to the drawings wherein the showings are for purposes of illustrating a preferred embodiment of the present invention only, and not for purposes of limiting the same. FIG. 1 shows a vehicle support network 10 constructed in accordance with an aspect of the present invention. The vehicle support network 10 includes a variety of components which collectively provide diagnostic and operational support for a vehicle 14.

As depicted in FIG. 1, vehicle 14 is equipped with an onboard diagnostic computer 30. The diagnostic computer 30 is in communication with many of the systems and components included in the vehicle 14. Exemplary components and systems may include, but are not limited to components and systems related to the vehicle's braking, velocity, acceleration, exhaust, engine temperature, power steering, engine speed, etc. It is understood that other systems and components may additionally be in communication with the onboard diagnostic computer 30.

Each system and component may be configured to generate diagnostic data during operation of the vehicle 14. The diagnostic data may be communicated to the diagnostic computer 30 for logging or analysis. The diagnostic data typically relates to the operating conditions of the respective system or component of the vehicle 14.

In most cases, the vehicle's system and components are configured to operate within preferred operational bounds. Operation of a particular system or component outside of the preferred operational bounds may be indicative of an existing or impending problem. Therefore, each system or component may generate a diagnostic trouble code when operating outside of the preferred operational bounds. The diagnostic trouble code may simply be an indication that a particular system or component is operating beyond the preferred operational bounds. The diagnostic data communicated to the diagnostic computer 30 may include the diagnostic trouble codes generated by the respective systems and components.

The diagnostic trouble codes may be retrieved from the onboard diagnostic computer 30 via an automotive diagnostic tool 12. The automotive diagnostic tool 12 may be hand portable and electrically and mechanically connectable to the onboard diagnostic computer 30 via a diagnostic port 16 located on the vehicle 14. The diagnostic tool 12 may include a connector 15 that is engageable with the diagnostic port 16. In most vehicles 14, the diagnostic port 16 is located on the dashboard. However the diagnostic port 16 may be located in other positions on some vehicles 14. It is contemplated that one embodiment of the automotive diagnostic tool 12 is detachably connected to the onboard diagnostic computer 30. In this regard, the automotive diagnostic tool 12 may be connected to a variety of different vehicles 14 to obtain the diagnostic data, including the diagnostic trouble codes for each vehicle 14. In another embodiment, the automotive diagnostic tool 12 is hard-wired into the onboard diagnostic computer 30. In that case, the automotive diagnostic tool 12 remains on the vehicle 14 to retrieve diagnostic data generated by the vehicle's systems and components.

One aspect of the present invention includes an automotive diagnostic tool 12 having a wireless communication circuit 18 as shown in FIG. 1. The wireless communication circuit 18 may enable data to be wirelessly communicated from the automotive diagnostic tool 12 to a variety of locations. The wireless communication circuit 18 may employ Bluetooth® technology, 802.11 format technology, infrared communication technology or other wireless communication technology known by those skilled in the art.

According to one aspect of the invention, the wireless communication circuit 18 may be able to interface directly with a wireless communication network 22 to achieve wireless communication with a wide range of locations. Data retrieved from the onboard diagnostic computer 30 may be wirelessly communicated from the onboard diagnostic computer 30 to a remote location 32 via the wireless communication circuit 18 on the automotive diagnostic tool 12.

It is understood that wirelessly communicating data over large distances may require sizable amounts of power. Therefore, the automotive diagnostic tool 12 may include a power port that is connectable to the vehicle's power supply to obtain power from the vehicle 14. The automotive diagnostic tool 12 may also include a power source 34 to enable independent operation of the tool 12. The power source 34 may also serve as a backup power supply in the even of power failure by the host system (e.g. the vehicle 14).

Power conservation may be a factor influencing the size and cost of the tool 12. As such, it may be desirable to minimize the amount of power consumed by the tool 12. One way of conserving power is decreasing the distance along which the wireless communication circuit 18 is required to communicate the data. As such, one embodiment of the present invention includes a wireless communication circuit 18 that is capable of interfacing with a personal communication device 20. As used herein, a personal communication device 20 may include a cell phone 21 or other wireless handheld devices known by those skilled in the art. Data may be communicated from the automotive diagnostic tool 12 to a remote location 32 via the personal communication device 20.

Figure 3:
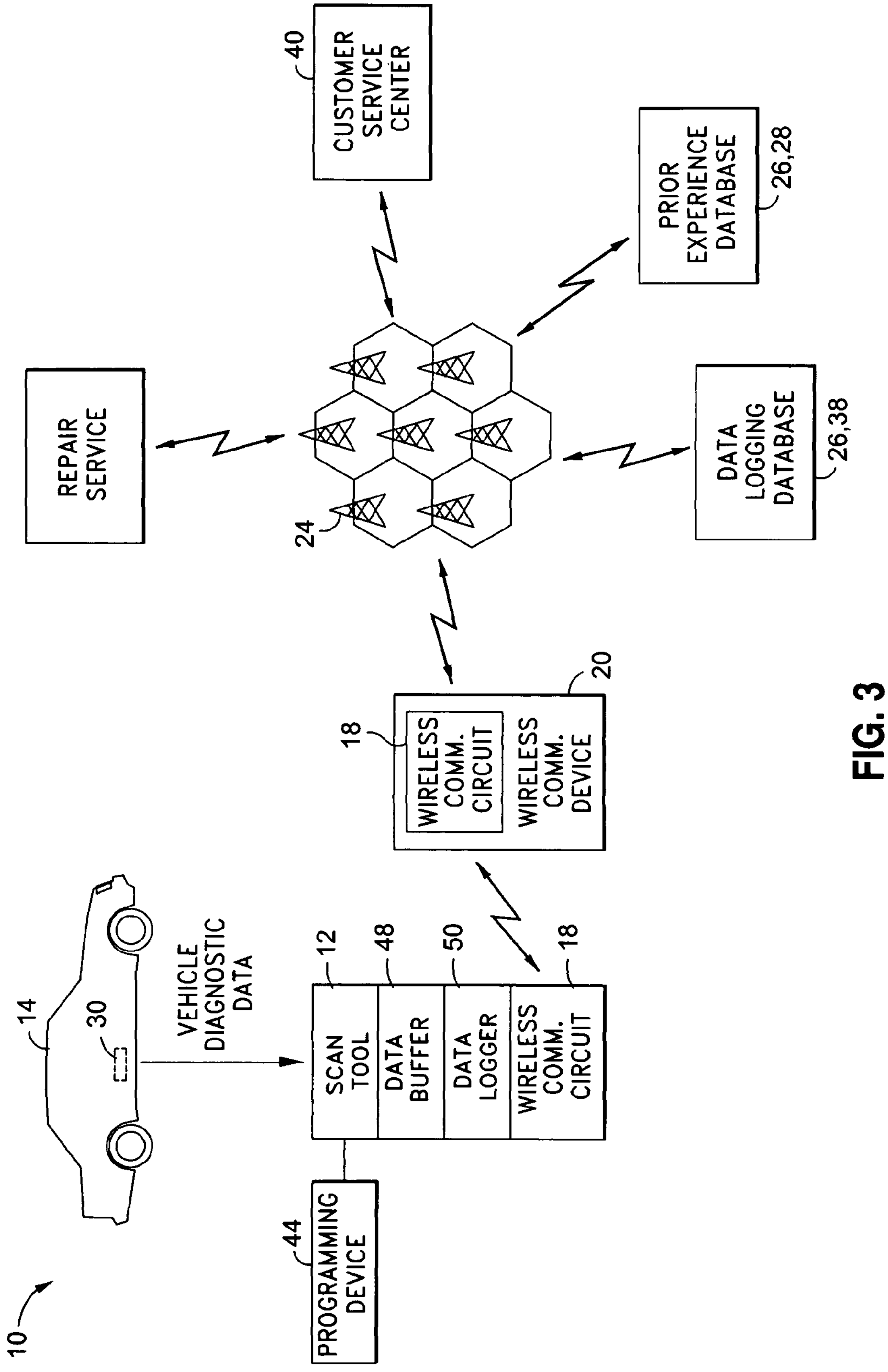
FIG. 3 is a schematic diagram of another embodiment of the vehicle diagnostic and support network, in accordance with an aspect of the present invention.
Figure 4:
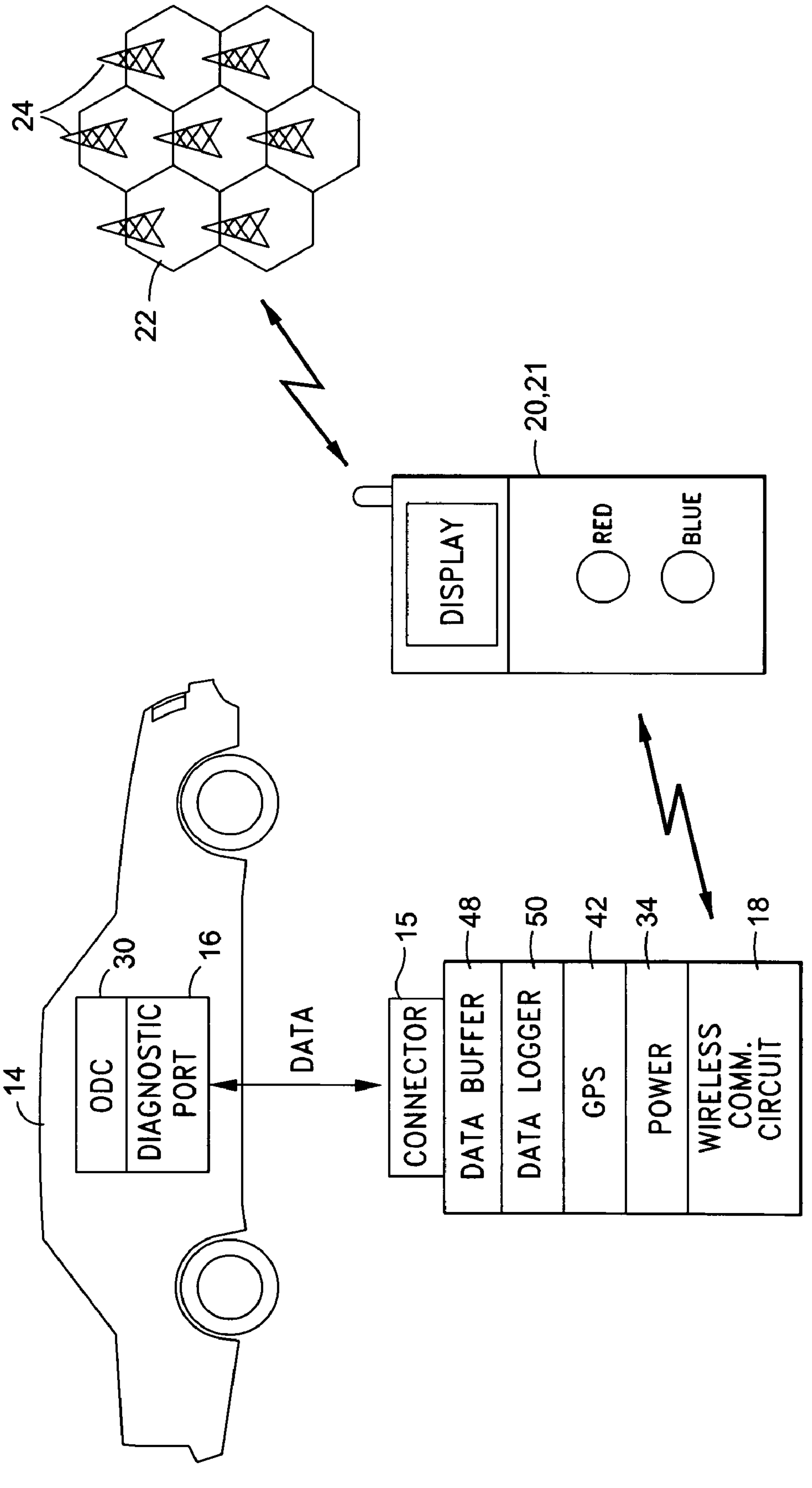
FIG. 4 illustrates an embodiment of an automotive diagnostic tool interfacing with a personal communication device, in accordance with an aspect of the present invention.

Typically, personal communication devices 20, such as cell phones 21, connect to a wireless communication network 22 having a plurality of base stations 24, as depicted in FIGS. 1, 3, and 4. A signal is sent from the personal communication device 20 to the base station 24 where it is relayed to the remote location 32. In this regard, a signal may be wirelessly communicated from the automotive diagnostic tool 12 to the remote location 32 via a personal communication device 20 without requiring sizable amounts of power from the automotive diagnostic tool 12. Most of the power required to communicate the data is supplied from the user's cell phone 21 or other personal communication device 20.

It is understood that other embodiments of the present invention include a wireless communications circuit 18 that interfaces directly with the wireless communication network 22. In this manner, the automotive diagnostic tool 12 includes the capability of directly interfacing with the wireless communication network 22. It may be desirable to mitigate the automotive diagnostic tool's dependency on the user's personal communication device 20. For instance, the user may not own a personal communication device 20. However, even if the user does own a personal communication device 20, the battery may be dead which would preclude wireless data transmission. Furthermore, the personal communication device 20 may not receive service in certain areas or it may be left at the user's home which would also prevent data communication. For these reasons, it may be desirable to configure the wireless communication circuit 18 to directly interface with the wireless communication network 22.

As previously mentioned above, the automotive diagnostic tool 12 may communicate data to a remote location 32. Such communication may include the transmission of diagnostic trouble codes, or other diagnostic data, to a user's personal computer 52 or a personal communication device 20 to alert the user of the diagnostic trouble codes. However, the user may be required to determine the source of the diagnostic trouble code. In other words, the user would have to determine which component or system is generating the trouble code. This step may require additional resources, such as a lookup table relating diagnostic trouble codes with associated components or systems. Consequently, the automotive diagnostic tool 12 may communicate the diagnostic trouble codes directly to an automotive repair professional capable of providing the user with a more complete diagnosis. The automotive diagnostic tool 12 may employ wireless communication technology described above in order to achieve such communication.

Given the complex nature of today's vehicles 14, more than one diagnostic trouble code may be generated within a relatively short period of time. Consequently, identifying a particular diagnostic failure source tends to be difficult when more than one trouble code is generated. Therefore, the automotive diagnostic tool 12 may communicate data to a remote database 26 configured to analyze the data generated and to output a diagnosis. One embodiment of the remote database 26 is a prior experience database 28. The prior experience database 28 includes information related to diagnostic solutions associated with combinations of diagnostic data. The prior experience database 28 is arranged to match the received vehicle diagnostic data to possible diagnostic solutions. It is contemplated that the automotive diagnostic tool 12 may communicate the vehicle diagnostic data to the prior experience database 28 via the cellular telephone network 22, either directly, or by way of a personal communication device 20.

The prior experience database 28 may include a prioritizer 36 connected thereto to prioritize the possible diagnostic solutions. The possible diagnostic solutions may be prioritized in accordance with ranked matches of the received diagnostic data to the previous combinations of diagnostic data stored in the prior experience database 28. The possible diagnostic solution associated with the highest ranked combination of diagnostic data is identified as the most likely solution. The most likely solution may be wirelessly communicated to a user's personal communication device 20 to alert the user of the likely diagnosis. For a more detailed description of prioritizing the possible diagnostic solutions generated from the prior experience database 28, please see U.S. patent application Ser. No. 11/823,757 entitled Automotive Diagnostic and Remedial Process, the contents of which are expressly incorporated herein by reference.

After the most likely solution is identified, the vehicle components associated with the most likely solution are identified by a vehicle component identifier 46. This may be performed by using a lookup table to associate the most likely solution with the identified vehicle components.

Once the vehicle components are identified, the automotive diagnostic tool 12 is configured to log diagnostic data related to the vehicle components. More specifically, a signal containing the most likely failure source is communicated from the prior experience database 28 to the automotive diagnostic tool 12. Upon receipt of the signal, the tool 12 is configured to log diagnostic data related to the vehicle components. In this manner, the data logging capability of the automotive diagnostic tool 12 is focused on the systems or components that are associated with the most likely solution in order to verify the source of the problem. The tool 12 may include a data logger 50 for logging data from the onboard diagnostic computer 30. As such, the onboard diagnostic computer 30 may be capable of obtaining operational data associated with each component or system connected thereto. The automotive diagnostic tool 12 may be configured to log such data in response to the vehicle components associated with the most likely solution being identified. As such, the automotive diagnostic tool 12 may send a signal to the onboard diagnostic computer 30 requesting such data. A user may be able to program the tool 12 to log data for a selectable period of time.

The diagnostic data received from the onboard diagnostic computer 30 may be useful to determine whether the identified most likely failure source is in fact the actual source of failure. If the diagnostic data does not show some irregularity or other signs of a problem, the identified most likely failure source may not be the actual failure source. In this event, the automotive diagnostic tool 12 may be reconfigured to log diagnostic data related to the components associated with a second most likely failure source. This process may be repeated until the logged data confirms that the identified likely failure source is the actual source of the failure.

As previously mentioned, the automotive diagnostic tool 12 may be capable of wirelessly communicating data, either independently, or via a personal communication device 20. Consequently, any data logged by the automotive diagnostic tool 12 may be communicated to a remote location 32, a personal communication device 20, or other locations known by those skilled in the art. In one embodiment, the remote location 32 may be a remote storage database 38 to store the data. The data stored at the remote storage database 38 may be retrieved for a variety of different reasons. For instance, the data may be helpful for accident reconstruction purposes. The data may show the operating conditions of the vehicle 14 up to the time of an accident, as well as following the accident. In addition, a parent may retrieve the information to monitor the driving habits of a child.

The remote location 32 may also include a customer service and support center 40. If a problem with the vehicle 14 has been identified and communicated to the customer service and support center 40, resources at the support center 40 may be devoted to assisting the driver with the identified problem. At the very least, the driver may receive a message or phone call from the customer service and support center 40 alerting the driver of the problem. In addition, it is contemplated that the automotive diagnostic tool 12 may include a GPS device 42 so the particular location of the vehicle 14 may also be communicated to the remote location 32. Personnel at the customer service and support center 40 may also arrange for vehicle repair services such as a tow truck or a repair man. Furthermore, personnel at the customer service and support center 40 may be able to communicate a signal to the vehicle 14 to perform a particular function, such as unlocking the doors, or opening the trunk.

In addition to the foregoing, it is also contemplated that various aspects of the present invention are directed toward programming a handheld automotive diagnostic tool 12 to log vehicle operation data in response to detection of specified diagnostic data. In this manner, the programmer may configure the automotive diagnostic tool 12 to focus its logging capabilities when a particular condition occurs. According to one embodiment, the automotive diagnostic tool 12 is configured to log data in response to detection of a specified diagnostic trouble code. The diagnostic tool 12 may receive the diagnostic trouble codes from the onboard diagnostic computer 30, as described in more detail above. Once the diagnostic tool 12 detects the specified diagnostic trouble code, it may log vehicle operation data.

The tool 12 may be connected to a programming device 44 to enable a user to program the tool 12. However, the tool 12 may include a user input, such as a keypad or touch screen to allow a user to program the tool 12 without an external programming device 44.

When the automotive diagnostic tool 12 is connected to the onboard diagnostic computer 30, the tool 12 receives diagnostic data which may include vehicle diagnostic codes and vehicle operation data. The diagnostic data may be buffered by a data buffer 48 located on the diagnostic tool 12. In this regard, the data may be temporarily stored on the automotive diagnostic tool 12. In one embodiment, the diagnostic data is temporarily stored for a selectable period of time. As such, the user may select the duration of the selectable time period. The temporarily stored data may be analyzed to detect the occurrence of the specified diagnostic trouble codes. If the diagnostic trouble codes are not detected, the data may be deleted.

Once the trouble codes are detected, vehicle operation data is logged by a data logger 50 on the tool 12. The logged data may be stored until it is reviewed by the user or an automotive professional. The logged data may be useful for accident reconstruction purposes or vehicle operation monitoring, as described in more detail above.

The diagnostic tool 12 may be interfaced with a wireless communication circuit 18 to communicate the diagnostic data and/or the logged vehicle operation data to a remote location 32. The wireless communication circuit 18 may communicate with a personal communication device 20, or directly with a wireless communication network 22. The remote location 32 may include a customer service center 40 or a prior experience database 28, as described in more detail above.

The information gathered from the diagnostic tool 12 may be useful in order to mitigate vehicle 14 failure or inefficient vehicle performance. Once the information is obtained, it may be communicated to a wide range of remote locations 32.

Although the above describes communication that is initiated by the tool 12 and sent to a variety of remote locations 32, it is also contemplated that communication may also be initiated from a remote location 32 and sent to the automotive diagnostic tool 12. Such communications may include instructions to tailor the data analysis and logging performed by the tool 12 in an effort to provide more thorough and effective diagnostic support.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of providing vehicle support through analysis of data received from an onboard vehicle computer, the method comprising the steps of:

a. receiving a combined set of vehicle diagnostic trouble codes (DTC's) from the onboard vehicle computer, the being received by a handheld automotive diagnostic tool;

b. communicating the combined set of received DTC's from the automotive diagnostic tool to a prior experience database having information related to diagnostic solutions associated with combined sets of DTC's stored in the database, the prior experience database being arranged to match the combined set of received DTC's to possible diagnostic solutions;

c. prioritizing the possible diagnostic solutions solely in accordance with ranked matches of the combined set of received DTC's to the combined sets of DTC's stored in the prior experience database, the possible diagnostic solution associated with the highest ranked combined set of DTC's stored in the database being identified as the most likely solution;

d. identifying vehicle components associated with the most likely solution; and e. configuring the automotive diagnostic tool to log diagnostic data related to the vehicle components associated with the most likely solution.

2. The method as recited in claim 1 wherein step (b) includes wirelessly communicating the combined set of received DTC's from the diagnostic tool to a personal communication device.

3. The method as recited in claim 1 wherein step (b) includes communicating the combined set of received DTC to the prior experience database via a cellular telephone network.

4. The method as recited in claim 3 further including the step of logging the data related to the vehicle components associated with the most likely solution.

5. The method as recited in claim 4 further including the step of wirelessly communicating the logged data from the automotive diagnostic tool to a personal communication device.

6. The method as recited in claim 4 wherein the diagnostic tool is configured to log diagnostic data for a selectable period of time.

7. The method as recited in claim 1 further including the step of logging the data related to the vehicle components associated with the most likely solution.

8. The method as recited in claim 7 further including the step of wirelessly communicating the logged data from the automotive diagnostic tool to a personal communication device.

9. The method as recited in claim 7 wherein the diagnostic tool is configured to log diagnostic data for a selectable period of time.

10. The method as recited in claim 1 further including the step of communicating the most likely solution to a personal communication device.

11. The method as recited in claim 10 furthering including the step of communicating the logged diagnostic data to a customer support center.

* * * * *

UNITED STATES PATENT AND TRADEMARK OFFICE

CERTIFICATE OF CORRECTION

PATENT NO. : 8,068,951 B2
APPLICATION NO. : 12/077855
DATED : November 29, 2011
INVENTOR(S) : Ieon C. Chen et al.

It is certified that error appears in the above-identified patent and that said Letters Patent is hereby corrected as shown below:

On the title page insert item (73)

-- (73) Assignee: Innova Electronics Corporation,
Fountain Valley, CA (US) --

Column 8, line 43, insert -- DTC's -- in front of "being received...."

Signed and Sealed this
Twentieth Day of March, 2012

David J. Kappos
*Director of the United States Patent and Trademark Office*